Patented July 5, 1927.

1,634,870

UNITED STATES PATENT OFFICE.

OTTO GERNGROSS, OF GRUNEWALD, NEAR BERLIN, GERMANY, ASSIGNOR TO THE FIRM CONTINENTALE AKTIENGESELLSCHAFT FÜR CHEMIE, OF BERLIN, GERMANY.

PROCESS FOR THE PRODUCTION OF AMMONIUM CHLORIDE AND ALKALI-METAL SULPHATE.

No Drawing. Application filed May 22, 1925, Serial No. 32,215, and in Germany June 11, 1924.

The usual process for the production of ammonium chloride (sal ammoniac) by conversion of ammonium sulphate with sodium chloride in aqueous solution has the disadvantage that the resulting dissolved mixture of ammonium chloride, sodium sulphate and a small amount of sodium chloride, can only be separated into its constituents, viz, sal ammoniac and sodium sulphate, with difficulty and loss in yield.

Another proposed process in which the dry conversion of ammonium sulphate and sodium- or potassium-chloride is known; this process can be carried out without difficulty when correct proportions are employed and certain temperatures are maintained; the ammonium chloride (sal ammoniac) is sublimed from the mixture in pure state, and the principal inconveniences of the above mentioned process are avoided. Only when certain temperatures are applied however, is a pure white product obtained which, without further rectification, corresponds to marketable goods of 96/100%.

The latter process has the disadvantage that the by-product which forms the residue in this process, i. e., sodium- or potassium-sulphate, has to be freed of the adhering impurities by re-crystallization, before it can be employed in the usual manner. This process is moreover tedious.

The invention which will be hereinafter described, relates to a process in which the inconveniences connected with the dry conversion process are avoided and whereby pure sublimated white sal ammoniac is obtained, the process being not limited to a predetermined temperature. Alkali-metal sulphate remains as residue, which, without re-crystallization, is adapted to be employed in the usual manner. The process according to the present invention is based on heating a mixture of ammonium sulphate and alkali-metal chloride in the presence of gases, the dry conversion of the mixture thus being carried out in the presence of gases. Preferably gases which have an oxidizing action are used, such as oxygen or chlorine. For producing these gases small quantities of such substances may be added to the said mixture during the dry conversion which, when heated will split off oxygen or chlorine, as for instance sodium peroxide, alkali-metal nitrate, alkali-metal chlorate, alkali-metal persulphate, hypochlorite and the like. The gases accelerate the process considerably so that it can be carried through in a fraction of the time formerly required.

This process will now be described by way of example:—

An intimate mixture of suitable quantities of ammonium sulphate with sodium chloride or potassium chloride and a small quantity of the above mentioned bodies which when being heated split off oxygen or chlorine, such as sodium peroxide, alkali metal nitrate, alkali metal chlorate, alkali metal persulphate, or the like, is prepared. The mixture is then brought into the sublimation vessel and heated until the water contained in the common salt or the like escapes with sufficient speed through the outflow pipe of the vessel. The mixture is then heated again rapidly and strongly. Numerically expressed the process is as follows:—100 kg. of ammonium sulphate give with 77 kg. of sodium chloride and 3,7 kg. of sodium chlorate an output of 75 kg. of pure white sal ammoniac and 100 kg. of calcinated pure white glauber-salt (sodium sulphate). If to the above stated quantities of ammonium sulphate and sodium chloride 4 kg. of hypochlorite or 3,2 kg. of alkali-metal nitrate or 3,3 kg. of persulphate are added, an output of 75 kg. of sal ammoniac and 100 kg. of glauber-salt is also obtained. The process is accelerated by the oxidizing gases generated in this process.

Having now particularly described and ascertained the nature of my said invention, I declare that what I claim is:—

1. A dry process for the production of ammonium chloride and alkali metal sulphate consisting in heating a mechanical mixture of ammonium sulphate and alkali-metal chloride in the presence of gases, said gases being generated during said heating of said mixtures by adding an alkali-metal compound thereto which when heated will split off such gases.

2. A dry process for the production of ammonium chloride and alkali metal sulphate consisting in heating a mechanical mixture of ammonium sulphate and alkali metal-chloride in the presence of oxidizing gases, said oxidizing gases being generated during said heating of said mixtures by adding an alkali-metal compound thereto which when heated will split off such gases.

3. A dry process for the production of ammonium chloride and alkali metal sulphate consisting in heating a mechanical mixture of ammonium sulphate, alkali metal chloride and an alkali-metal compound which when heated will split off gases.

4. A dry process for the production of ammonium chloride and alkali metal sulphate consisting in heating a mechanical mixture of ammonium sulphate, alkali metal chloride and an alkali-metal compound which when heated will split off oxidizing gases.

5. A dry process for the production of ammonium chloride and alkali metal sulphate consisting in heating a mechanical mixture of ammonium sulphate, alkali metal chloride and an alkali-metal compound which when heated will split off oxygen.

6. A dry process for the production of ammonium chloride and alkali metal sulphate consisting in heating a mechanical mixture of ammonium sulphate and alkali metal chloride in the presence of alkali-metal chlorate.

In testimony whereof I have hereunto set my hand.

OTTO GERNGROSS.